US012326041B2

(12) United States Patent
Leng

(10) Patent No.: US 12,326,041 B2
(45) Date of Patent: Jun. 10, 2025

(54) LADDER STRUCTURE FOR FRAME BED

(71) Applicant: New-Tec Integration (Xiamen) Co., Ltd., Fujian (CN)

(72) Inventor: Luhao Leng, Fujian (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 684 days.

(21) Appl. No.: 17/722,687

(22) Filed: Apr. 18, 2022

(65) Prior Publication Data

US 2023/0203887 A1 Jun. 29, 2023

(30) Foreign Application Priority Data

Dec. 23, 2021 (CN) ......................... 202123269248.2

(51) Int. Cl.

| | |
|---|---|
| ***E06C 1/34*** | (2006.01) |
| ***A47C 19/20*** | (2006.01) |
| *E06C 1/36* | (2006.01) |
| *E06C 7/06* | (2006.01) |
| *E06C 7/18* | (2006.01) |
| *E06C 7/44* | (2006.01) |
| *E06C 7/46* | (2006.01) |

(52) U.S. Cl.

CPC ................ *E06C 1/34* (2013.01); *A47C 19/20* (2013.01); *E06C 1/36* (2013.01); *E06C 7/06* (2013.01); *E06C 7/188* (2013.01); *E06C 7/44* (2013.01); *E06C 7/46* (2013.01)

(58) Field of Classification Search

CPC ... E06C 7/46; E06C 7/44; E06C 7/423; E06C 7/188; E06C 1/34; E06C 7/06; E06C 7/18; E06C 5/36; E06C 1/36; A47C 19/005; A47C 19/22; A47C 19/20

See application file for complete search history.

(56) References Cited

U.S. PATENT DOCUMENTS 416,226 A * 12/1889 Kidder ...................... E06C 1/34 182/206
3,269,486 A * 8/1966 Machen .................... E06C 1/22 182/170
3,282,375 A * 11/1966 Ray ........................... E06C 1/34 182/20

(Continued)

FOREIGN PATENT DOCUMENTS

| | | | |
|---|---|---|---|
| DE | 4129507 A1 * | 11/1993 | |
| GB | 2166793 A * | 5/1986 | |
| KR | 100971040 B1 * | 7/2010 | |

*Primary Examiner* — Phi D A

(74) *Attorney, Agent, or Firm* — Cooper Legal Group, LLC

(57) ABSTRACT

A ladder structure for a frame bed comprises a ladder and a connecting member. The ladder comprises two side bars symmetrically located on a left side and a right side of the ladder and a plurality of transverse step bars connected to the two side bars and spaced apart from one another along a length direction of the side bars. An upper end of each of the two side bars of the ladder is connected to a side of an upper bunk frame. The ladder is disposed obliquely. Lower ends of the two side bars of the ladder are supported on the ground. A first end of the connecting member is connected to at least one of the two side bars of the ladder, and a second end of the connecting member is connected to a column of the plurality of columns which is most adjacent to the ladder.

18 Claims, 4 Drawing Sheets

(56) References Cited

U.S. PATENT DOCUMENTS

| | | | | | |
|---|---|---|---|---|---|
| 4,467,890 | A * | 8/1984 | McCallum | E06C 7/48 | 182/189 |
| 4,706,780 | A * | 11/1987 | Ohashi | E06C 1/34 | 248/230.8 |
| 4,722,420 | A * | 2/1988 | Arthurs | E06C 7/48 | 182/201 |
| 4,913,262 | A * | 4/1990 | DeBlois | E06C 7/505 | 5/9.1 |
| 6,044,930 | A * | 4/2000 | Hayman | E06C 1/34 | 182/206 |
| 12,221,834 | B1 * | 2/2025 | Mah | E06C 7/423 | |
| 2002/0179369 | A1 * | 12/2002 | Wallace | E06C 5/04 | 182/127 |
| 2013/0025969 | A1 * | 1/2013 | Horn | E06C 7/48 | 182/8 |

* cited by examiner

LADDER STRUCTURE FOR FRAME BED

RELATED APPLICATIONS

This application claims priority to Chinese patent application number 202123269248.2, filed on Dec. 23, 2021. Chinese patent application number 202123269248.2 is incorporated herein by reference.

FIELD OF THE DISCLOSURE

The present disclosure relates to a ladder, and in particular to a ladder structure for a frame bed.

BACKGROUND OF THE DISCLOSURE

Ladders are placed between an upper bunk bed and a lower bunk bed of frame beds so that people can climb to and from the upper bunk at any time. Different from a structure of a wooden bed, a frame of the frame beds is composed of metal steel pipes. The ladders are generally placed vertically. The frame beds used in dormitories are all of this structure. The ladders of traditional frame beds have great potential safety hazards due to the vertical placement of the ladders. On the one hand, the ladders are too steep. When people climb the ladders, their whole bodies are almost in a suspended state. It is easy to fall to the ground. On the other hand, an upper end and a lower end of the ladders are respectively connected to crossbars of the upper bunk and lower bunk. When people climb the ladders, all the weight of the human body is exerted on one side of the ladder. Forces acting on the frame beds are unbalanced, the frame beds are easy to shake, and the frame beds will become loose after a long time of use. Furthermore, such a vertically arranged ladder is also very difficult to climb up.

BRIEF SUMMARY OF THE DISCLOSURE

The present disclosure provides a ladder structure for a frame bed, which has a good safety performance and is easy to use. A technical solution of the present disclosure is as follows.

A ladder structure for a frame bed comprises a ladder and a connecting member. The frame bed comprises an upper bunk frame, a lower bunk frame, and a plurality of columns for supporting the upper bunk frame and the lower bunk frame. The ladder comprises two side bars symmetrically located on a left side and a right side of the ladder and a plurality of transverse step bars connected to the two side bars and spaced apart from one another along a length direction of the two side bars. An upper end of each of the two side bars of the ladder is connected to a side of the upper bunk frame. The ladder is disposed obliquely with respect to ground. A lower end of each of the two side bars of the ladder is supported on the ground. A first end of the connecting member is connected to at least one of the two side bars of the ladder, and a second end of the connecting member is connected to a column of the plurality of columns which is most adjacent to the ladder. A connection point at which the connecting member is connected to the at least one of the two side bars is located on a lower part of the at least one of the two side bars, and a connection point at which the connecting member is connected to the column of the plurality of columns is located on a lower part of the column of the plurality of columns.

The ladder is disposed obliquely with respect to the ground. When a user climbs up the ladder, it is similar to walking on stairs, which is convenient and safe to use. A lower end of the ladder is supported on the ground. The weight can be dispersed on the ground, and a structure of the frame bed is stable. In particular, the connecting member is provided between at least one of the two side bars and the column of the plurality of columns of the ladder. When the ladder is manually pulled outward, such as by accidentally kicking the ladder, the connecting member can pull the ladder to prevent the ladder from being pulled out and deformed, so that the ladder has a more reliable safety performance.

In a preferred embodiment, a height of the connecting member is lower than a height of the lower bunk frame. The connecting member is in a lower position to better hold the ladder.

In a preferred embodiment, the first end of the connecting member is connected to a lower end of the at least one of the two side bars, and the second end of the connecting member is connected to a lower end of the column of the plurality of columns. The connecting member is adjacent to the ground, does not easily trip the user, and has better safety.

In a preferred embodiment, the first end of the connecting member comprises an inserting terminal, the second end of the connecting member comprises a sleeving ring, the inserting terminal is disposed in an opening of the lower end of the at least one of the two side bars, and the sleeving ring is sleeved on the lower end of the column of the plurality of columns. The connecting member is inserted into the at least one of the two side bars and sleeved with the column of the plurality of columns, the structure is firm, and the assembly is simple.

In a preferred embodiment, the connecting member is made of plastic.

In a preferred embodiment, the ladder is located on a front side of the frame bed, and the upper end of each of the two side bars of the ladder is connected to a front transverse bar of the upper bunk frame. The ladder is on the front side of the frame bed, and a distance between the connecting member and the column of the plurality of columns is small, which is convenient for setting the connecting member.

In a preferred embodiment, the first end of the connecting member is connected to a side bar of the two side bars which is adjacent to the column of the plurality of columns. The connecting member has a shortest length.

In a preferred embodiment, the upper end of each of the two side bars of the ladder is bent to form a buckle groove, and the buckle groove is fastened to the front transverse bar of the upper bunk frame from top to bottom. The two side bars are directly buckled with the front transverse bar of the upper bunk frame through the buckle groove, the lower end of each of the two side bars is directly supported on the ground, the structure is simple, and the assembly is convenient.

In a preferred embodiment, the upper end of each of the two side bars of the ladder and the front transverse bar of the upper bunk frame are locked to each other by bolts.

In a preferred embodiment, an included angle between the ladder and the plurality of columns is within 15-25 degrees.

DETAILED DESCRIPTION OF THE EMBODIMENTS

The present disclosure will be further described below in combination with the accompanying drawings and embodiments.

Figure 1:
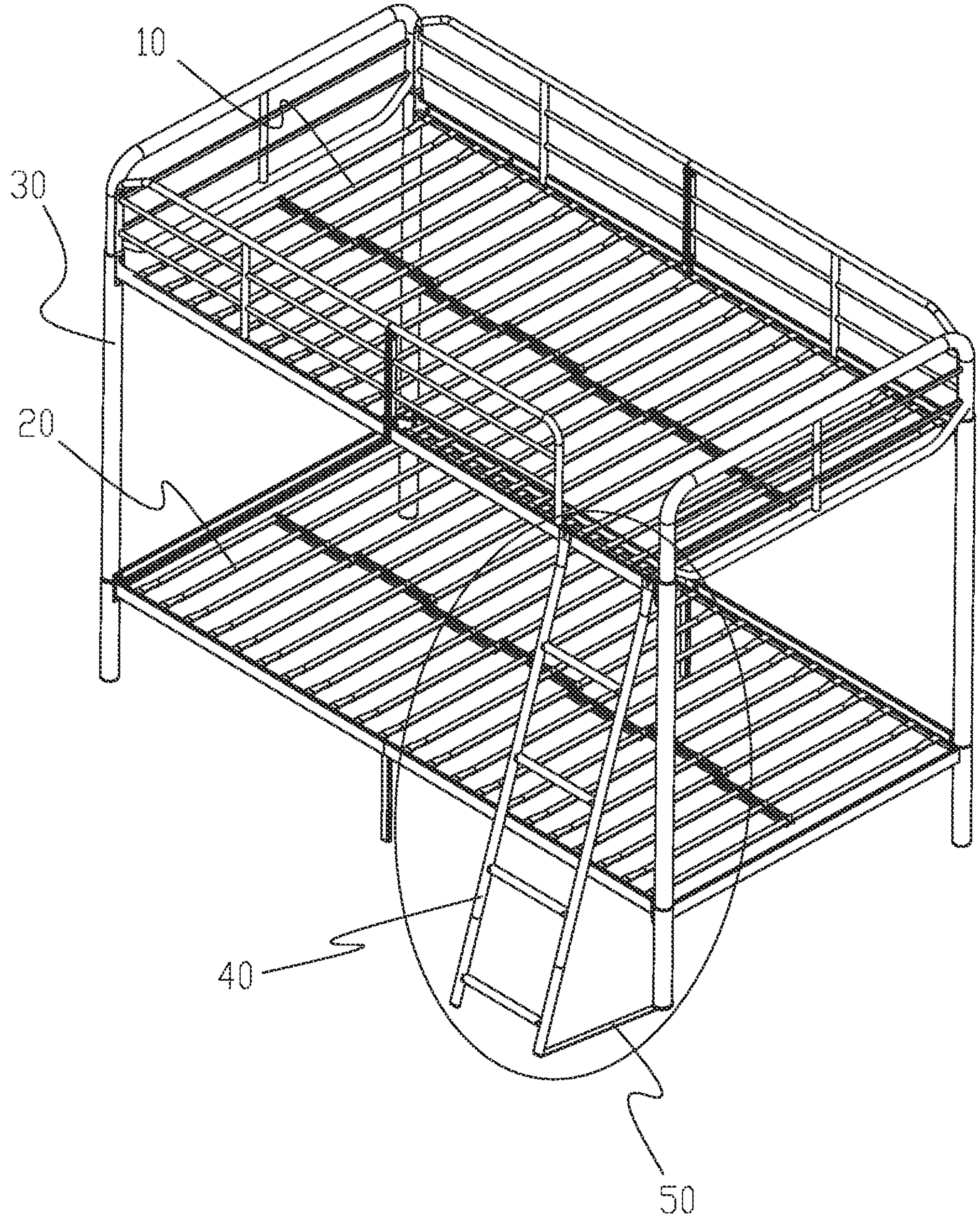
FIG. 1 illustrates a perspective view of a ladder structure for a frame bed of the present disclosure.
Figure 2:
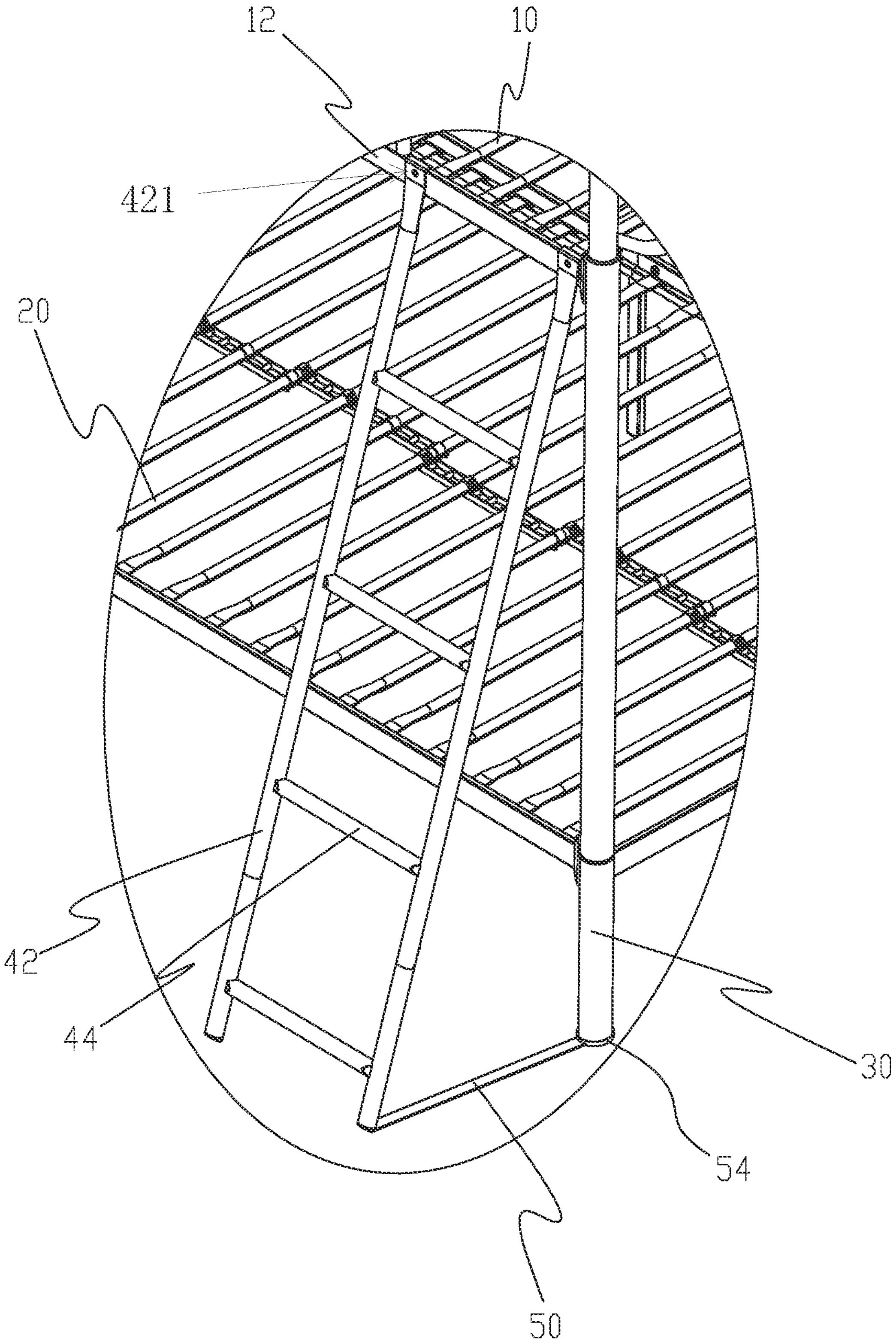
FIG. 2 illustrates an enlarged view of a circle in FIG. 1.
Figure 3:
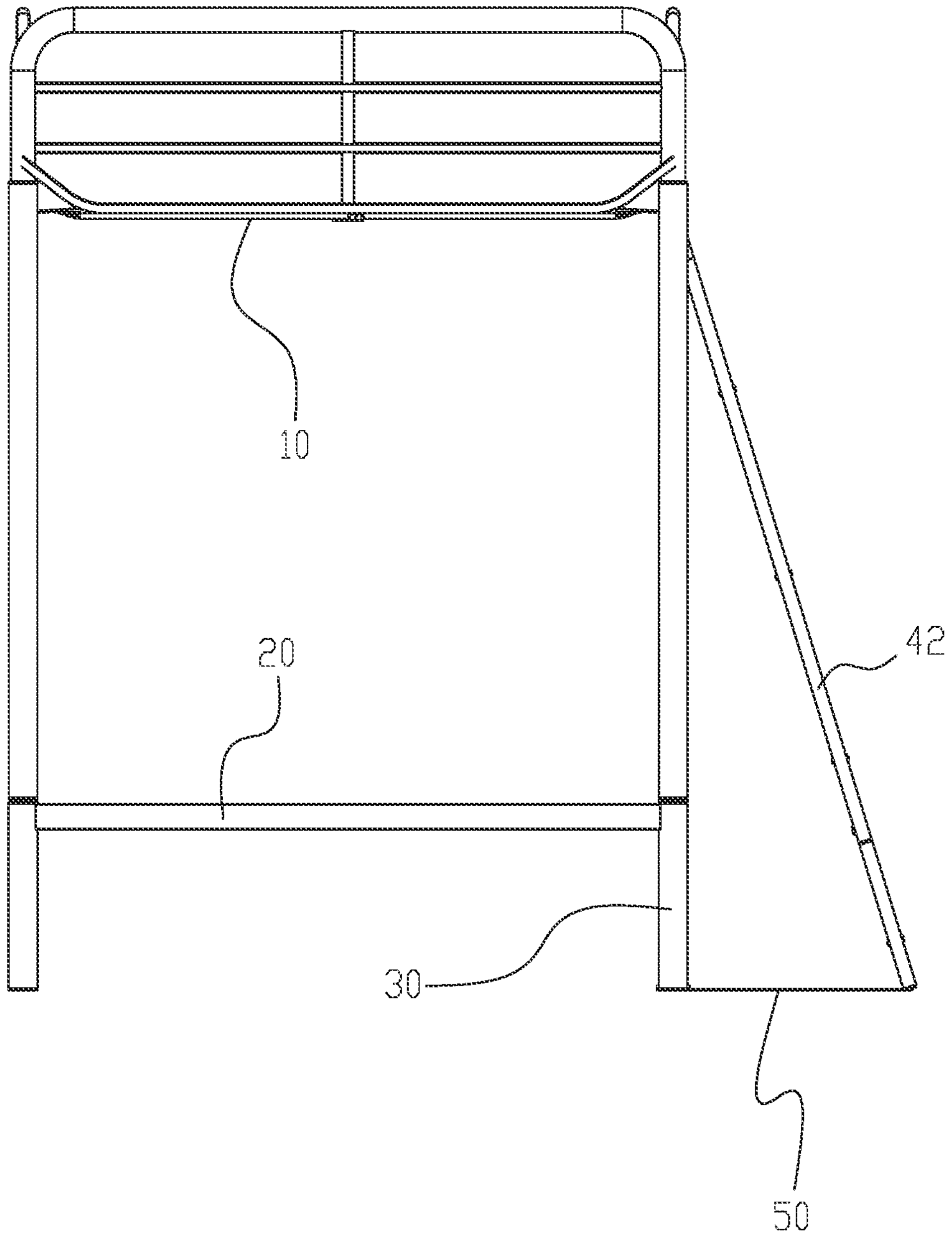
FIG. 3 illustrates a side view of the ladder structure in FIG. 1.
Figure 4:
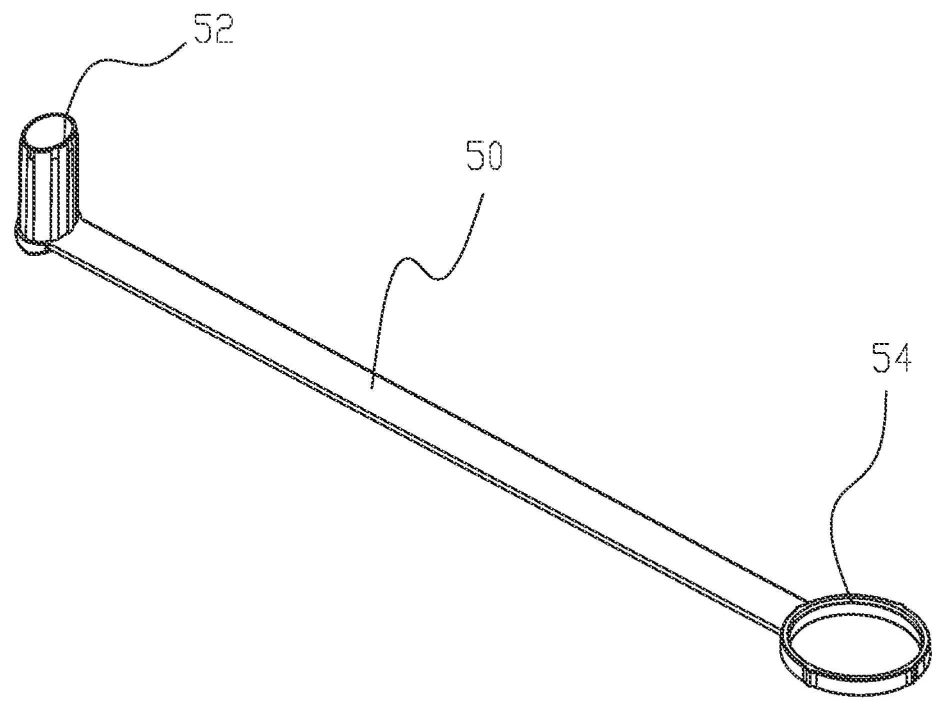
FIG. 4 illustrates a perspective view of a connecting member in FIG. 1.

Referring to FIGS. 1 to 4, a ladder structure for a frame bed is illustrated. The frame bed comprises an upper bunk frame 10, a lower bunk frame 20, and a plurality of columns 30 for supporting the upper bunk frame 10 and the lower bunk frame 20. The plurality of columns 30 are usually four columns 30 respectively disposed on four corners of the frame bed. The ladder structure comprises a ladder 40, and the ladder 40 comprises two side bars 42 symmetrically located on a left side and a right side of the ladder 40 and a plurality of transverse step bars 44 connected to the two side bars 42 and spaced apart from one another along a length direction of the two side bars 42. A user can climb up step-by-step by stepping on the plurality of transverse step bars 44. The ladder 40 is disposed obliquely with respect to the ground. An upper end of each of the two side bars 42 of the ladder 40 is connected to a side of the upper bunk frame 10, and a lower end of each of the two side bars 42 of the ladder 40 is supported on the ground. The ladder structure also comprises a connecting member 50. A first end of the connecting member 50 is connected to at least one of the two side bars 42 of the ladder 40, and a second end of the connecting member 50 is connected to a column of the plurality of columns 30 which is most adjacent to the ladder 40. A connection point at which the connecting member 50 is connected to the at least one of the two side bars 42 is located on a lower part of the at least one of the two side bars 42, and a connection point at which the connecting member 50 is connected to the column of the plurality of columns 30 is also located on a lower part of the column of the plurality of columns 30. The ladder structure of the present disclosure is simple and practical, no additional assembly components are added, and the assembly is simple.

Preferably, a height of the connecting member 50 is lower than a height of the lower bunk frame 20.

Preferably, the first end of the connecting member 50 is connected to a lower end of the at least one of the two side bars 42, and the second end of the connecting member 50 is connected to a lower end of the column of the plurality of columns 30.

Preferably, the first end of the connecting member 50 comprises an inserting terminal 52, and the second end of the connecting member 50 comprises a sleeving ring 54. The inserting terminal 52 is inserted into an opening of the lower end of the at least one of the two side bars 42, and the sleeving ring 54 is sleeved on the lower end of the column of the plurality of columns 30. It can be understood that each of the first end and the second end of the connecting member 50 can comprises the inserting terminal 52 or can comprises the sleeving ring 54.

Preferably, the connecting member 50 is made of plastic.

Preferably, the ladder 40 is located on a front side of the frame bed, and the upper end of each of the two side bars 42 of the ladder is connected to a front transverse bar 12 of the upper bunk frame 10.

Preferably, the first end of the connecting member 50 is connected to a side bar 42 of the two side bars 42 which is adjacent to the column of the plurality of columns.

Preferably, the upper end of each of the two side bars 42 of the ladder is bent to form a buckle groove 421, and the buckle groove 421 is fastened to the front transverse bar 12 of the upper bunk frame 10 from top to bottom. Further preferably, the upper end of each of the two side bars 42 of the ladder and the front transverse bar 12 of the upper bunk frame 10 are locked to each other by bolts.

Preferably, an included angle between the ladder and the plurality of columns 30 is within 15-25 degrees. The included angle range can have a relatively good climbing slope, and at the same time, a weight can be better transmitted to the ground to ensure strength of the ladder. In this embodiment, the included angle is about 17 degrees.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A ladder structure for a frame bed, comprising:
a ladder, and
a connecting member, wherein:
the frame bed comprises an upper bunk frame, a lower bunk frame, and a plurality of columns for supporting the upper bunk frame and the lower bunk frame,
the ladder comprises two side bars symmetrically located on a left side and a right side of the ladder and a plurality of transverse step bars connected to the two side bars and spaced apart from one another along a length direction of the two side bars,
an upper end of each of the two side bars of the ladder is connected to a side of the upper bunk frame,
the ladder is disposed obliquely with respect to ground,
a lower end of each of the two side bars of the ladder is supported on the ground,
a first end of the connecting member is connected to at least one of the two side bars of the ladder,
a second end of the connecting member is connected to a column of the plurality of columns which is most adjacent to the ladder,
a connection point at which the connecting member is connected to the at least one of the two side bars is located on a lower part of the at least one of the two side bars, and
a connection point at which the connecting member is connected to the column of the plurality of columns is located on a lower part of the column of the plurality of columns.

2. The ladder structure for the frame bed according to claim 1, wherein:
a height of the connecting member is lower than a height of the lower bunk frame.

3. The ladder structure for the frame bed according to claim 2, wherein:
the first end of the connecting member is connected to a lower end of the at least one of the two side bars, and
the second end of the connecting member is connected to a lower end of the column of the plurality of columns.

4. The ladder structure for the frame bed according to claim 3, wherein:
the first end of the connecting member comprises an inserting terminal,
the second end of the connecting member comprises a sleeving ring, the inserting terminal is disposed in an opening of the lower end of the at least one of the two side bars, and the sleeving ring is sleeved on the lower end of the column of the plurality of columns.

5. The ladder structure for the frame bed according to claim 4, wherein:

the connecting member is made of plastic.

6. The ladder structure for the frame bed according to claim 1, wherein:

the ladder is located on a front side of the frame bed, and the upper end of each of the two side bars of the ladder is connected to a front transverse bar of the upper bunk frame.

7. The ladder structure for the frame bed according to claim 6, wherein:

the first end of the connecting member is connected to a side bar of the two side bars which is adjacent to the column of the plurality of columns.

8. The ladder structure for the frame bed according to claim 6, wherein:

the upper end of each of the two side bars of the ladder is bent to form a buckle groove, and the buckle groove is fastened to the front transverse bar of the upper bunk frame from top to bottom.

9. The ladder structure for the frame bed according to claim 8, wherein:

the upper end of each of the two side bars of the ladder and the front transverse bar of the upper bunk frame are locked to each other by bolts.

10. The ladder structure for the frame bed according to claim 1, wherein:

an included angle between the ladder and the plurality of columns is within 15-25 degrees.

11. The ladder structure for the frame bed according to claim 2, wherein:

an included angle between the ladder and the plurality of columns is within 15-25 degrees.

12. The ladder structure for the frame bed according to claim 3, wherein:

an included angle between the ladder and the plurality of columns is within 15-25 degrees.

13. The ladder structure for the frame bed according to claim 4, wherein:

an included angle between the ladder and the plurality of columns is within 15-25 degrees.

14. The ladder structure for the frame bed according to claim 5, wherein:

an included angle between the ladder and the plurality of columns is within 15-25 degrees.

15. The ladder structure for the frame bed according to claim 6, wherein:

an included angle between the ladder and the plurality of columns is within 15-25 degrees.

16. The ladder structure for the frame bed according to claim 7, wherein:

an included angle between the ladder and the plurality of columns is within 15-25 degrees.

17. The ladder structure for the frame bed according to claim 8, wherein:

an included angle between the ladder and the plurality of columns is within 15-25 degrees.

18. The ladder structure for the frame bed according to claim 9, wherein:

an included angle between the ladder and the plurality of columns is within 15-25 degrees.

* * * * *